US012779811B2

(12) United States Patent
Chen et al.

(10) Patent No.: US 12,779,811 B2
(45) Date of Patent: Nov. 3, 2026

(54) LAMINATED GLASS ASSEMBLY, SIGNAL TRANSMISSION SYSTEM, AND VEHICLE

(71) Applicant: FUYAO GLASS INDUSTRY GROUP CO., LTD., Fuqing (CN)

(72) Inventors: Zhixin Chen, Fuqing (CN); Yuemin Lu, Fuqing (CN); Jinliang Guan, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 266 days.

(21) Appl. No.: 18/654,589

(22) Filed: May 3, 2024

(65) Prior Publication Data

US 2024/0300206 A1 Sep. 12, 2024

Related U.S. Application Data

(63) Continuation of application No. PCT/CN2022/129798, filed on Nov. 4, 2022.

(30) Foreign Application Priority Data

Nov. 5, 2021 (CN) ........................ 202111305472.4

(51) Int. Cl.
*B32B 3/26* (2006.01)
*B32B 17/10* (2006.01)
(Continued)

(52) U.S. Cl.
CPC ........ *B32B 3/266* (2013.01); *B32B 17/10036* (2013.01); *B32B 17/1011* (2013.01);
(Continued)

(58) Field of Classification Search
CPC .............. B32B 3/266; B32B 17/10036; B32B 17/1011; B32B 17/1022; B32B 17/10779;
(Continued)

(56) References Cited

FOREIGN PATENT DOCUMENTS

| | | |
|---|---|---|
| CN | 111409314 A | 7/2020 |
| CN | 111703151 A | 9/2020 |

(Continued)

OTHER PUBLICATIONS

English Machine Translation of CN 111703151 A (Year: 2020).*
(Continued)

*Primary Examiner* — David Z Huang
(74) *Attorney, Agent, or Firm* — Scully, Scott, Murphy & Presser, P.C.

(57) ABSTRACT

A laminated glass assembly, a signal transmission system, and a vehicle are provided. The laminated glass assembly includes laminated glass, a wave transparent layer, and a thermal insulation layer. The laminated glass has a signal transmission region and a non-signal transmission region. The wave transparent layer is carried on the laminated glass. An orthographic projection of the wave transparent layer on the laminated glass covers the signal transmission region and the non-signal transmission region. The thermal insulation layer is carried on the laminated glass. An orthographic projection of the thermal insulation layer on the laminated glass covers the non-signal transmission region and avoids the signal transmission region.

18 Claims, 11 Drawing Sheets

(51) Int. Cl.
*G01C 21/28* (2006.01)
*B60J 1/00* (2006.01)

(52) U.S. Cl.
CPC .... *B32B 17/1022* (2013.01); *B32B 17/10779* (2013.01); *G01C 21/28* (2013.01); *B32B 2307/304* (2013.01); *B32B 2605/08* (2013.01); *B60J 1/001* (2013.01)

(58) Field of Classification Search
CPC .......... B32B 17/1044; B32B 17/10174; B32B 17/00; B32B 7/12; B32B 17/10; B32B 27/306; B32B 27/40; B32B 33/00; G01S 17/931; C03C 17/3644; C03C 17/3411; C03C 17/36; C03C 17/3681; C03C 27/10; B60J 3/06; B60W 40/02
See application file for complete search history.

(56) References Cited

FOREIGN PATENT DOCUMENTS

| | | | |
|---|---|---|---|
| CN | 112208310 | A | 1/2021 |
| CN | 113246562 | A | 8/2021 |
| GB | 1015706 | A | 1/1966 |
| JP | 2003034554 | A | 2/2003 |
| JP | 2004196184 | A | 7/2004 |
| JP | 2015024930 | A | 2/2015 |
| JP | 2021127286 | A | 9/2021 |
| JP | 2021147243 | A | 9/2021 |
| WO | 2015137518 | A1 | 9/2015 |
| WO | 2021125209 | A1 | 6/2021 |

OTHER PUBLICATIONS

English Machine Translation of JP 2015-24930 A (Year: 2015).*
Han Jun et al., "Physical Optics Learning Guide", National Defense Industry Press (Oct. 31, 2012), p. 128.
Chinese First Office Action dated Jun. 20, 2022 issued in CN 202111305472.4.
International Search Report dated Jan. 6, 2023 issued in PCT/CN2022/129798.
The Extended European Search Report dated Feb. 24, 2025 issued in corresponding EP patent application No. 22889402.8.
Notice of Reasons for Refusal dated Apr. 25, 2025 issued in corresponding JP patent application No. 2024-526512.
Request for the Submission of an Opinion issued in corresponding KR application No. 2024-7015412 dated Feb. 23, 2026.

* cited by examiner

LAMINATED GLASS ASSEMBLY, SIGNAL TRANSMISSION SYSTEM, AND VEHICLE

CROSS-REFERENCE TO RELATED APPLICATIONS

This application is a continuation of International Application No. PCT/CN2022/129798, filed Nov. 4, 2022, which claims priority to Chinese Patent Application No. 202111305472.4, filed Nov. 5, 2021, the entire disclosures of which are incorporated herein by reference.

TECHNICAL FIELD

This disclosure relates to the field of vehicle autonomous driving, and in particular to a laminated glass assembly, a signal transmission system, and a vehicle.

BACKGROUND

With the development of intelligent driving vehicles, application requirements for mounting detectors in the vehicle gradually increase, and thermal insulation glass is increasingly used as vehicle window glass. When passing through the thermal insulation glass, detection signals from the detector are absorbed and/or reflected by the thermal insulation glass. Therefore, a transmittance of the thermal insulation glass for the detection signal transmitted from the detector is greatly reduced, so that detection accuracy of the detector is reduced and the detector is unable to work normally.

SUMMARY

In a first aspect, a laminated glass assembly is provided in the present disclosure. The laminated glass assembly includes laminated glass, a wave transparent layer, and a thermal insulation layer. The laminated glass has a signal transmission region and a non-signal transmission region. The wave transparent layer is carried on the laminated glass. An orthographic projection of the wave transparent layer on the laminated glass covers the signal transmission region and the non-signal transmission region. The thermal insulation layer is carried on the laminated glass. An orthographic projection of the thermal insulation layer on the laminated glass covers the non-signal transmission region and avoids the signal transmission region.

In a second aspect, a signal transmission system is further provided in the present disclosure. The signal transmission system includes a detector and a laminated glass assembly. The laminated glass assembly includes laminated glass, a wave transparent layer, and a thermal insulation layer. The laminated glass has a signal transmission region and a non-signal transmission region. The laminated glass includes a first transparent substrate and a second transparent substrate. The first transparent substrate has a first surface and a second surface opposite to the first surface. The second transparent substrate has a third surface and a fourth surface opposite to the third surface. The third surface is closer to the second surface than the fourth surface. The adhesive film is for adhering the first transparent substrate and the second transparent substrate. The wave transparent layer is carried on the laminated glass. An orthographic projection of the wave transparent layer on the laminated glass covers the signal transmission region and the non-signal transmission region. The thermal insulation layer is carried on the laminated glass. An orthographic projection of the thermal insulation layer on the laminated glass covers the non-signal transmission region and avoids the signal transmission region. The detector is disposed corresponding to the signal transmission region. A detection signal emitted and/or received by the detector passes through the signal transmission region. A wavelength of the detection signal ranges from 380 nm to 1650 nm or from 3 mm to 30 mm. The detection signal is incident into the signal transmission region at an angle of incidence of 55°-70°.

In a third aspect, a vehicle is further provided in the present disclosure. The vehicle includes a vehicle body and a signal transmission system. The signal transmission system includes a detector and a laminated glass assembly. The laminated glass assembly includes laminated glass, a wave transparent layer, and a thermal insulation layer. The laminated glass has a signal transmission region and a non-signal transmission region. The laminated glass includes a first transparent substrate and a second transparent substrate. The first transparent substrate has a first surface and a second surface opposite to the first surface. The second transparent substrate has a third surface and a fourth surface opposite to the third surface. The third surface is closer to the second surface than the fourth surface. The adhesive film is for adhering the first transparent substrate and the second transparent substrate. The wave transparent layer is carried on the laminated glass. An orthographic projection of the wave transparent layer on the laminated glass covers the signal transmission region and the non-signal transmission region. The thermal insulation layer is carried on the laminated glass. An orthographic projection of the thermal insulation layer on the laminated glass covers the non-signal transmission region and avoids the signal transmission region. The detector is disposed corresponding to the signal transmission region. A detection signal emitted and/or received by the detector passes through the signal transmission region. A wavelength of the detection signal ranges from 380 nm to 1650 nm or from 3 mm to 30 mm. The detection signal is incident into the signal transmission region at an angle of incidence of 55°-70°. The signal transmission system is carried on the vehicle body.

BRIEF DESCRIPTION OF THE DRAWINGS

To describe the technical solutions in embodiments of the present disclosure more clearly, the accompanying drawings for use in implementations are briefly described. Apparently, the accompanying drawings in the following description show merely some implementations of the present disclosure, and those of ordinary skill in the art may obtain other accompanying drawings from these accompanying drawings without creative effort.

Figure 1:
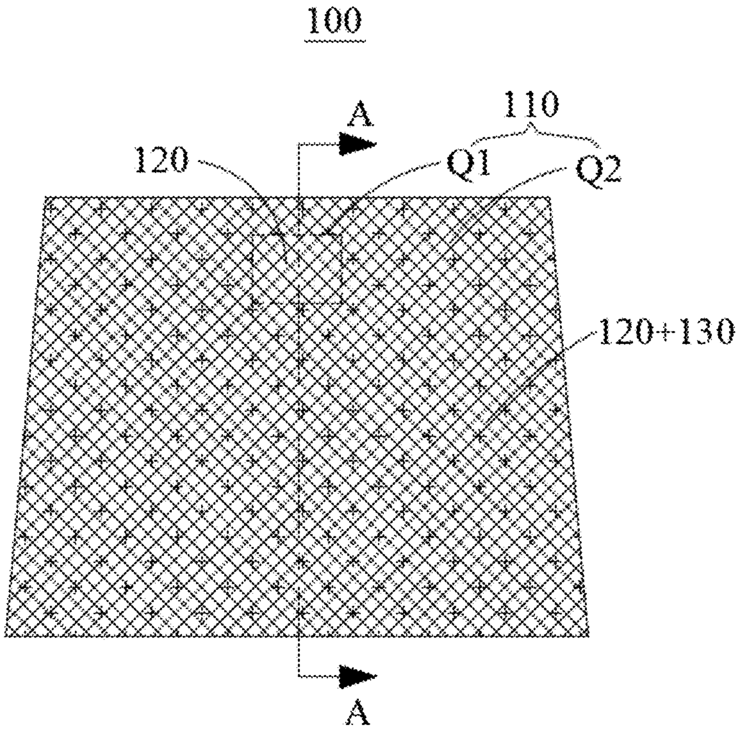
FIG. 1 is a schematic view of a laminated glass assembly provided in an implementation of the present disclosure.

Reference signs in the accompanying drawings are described as follows: vehicle 1; signal transmission system 10; vehicle body 20; laminated glass assembly 100; detector 200; laminated glass 110; wave transparent layer 120; thermal insulation layer 130; through hole 140; filler 150; signal transmission region Q1; non-signal transmission region Q2; first transparent substrate 1110; second transparent substrate 1120; adhesive film 1130; first surface 1111; second surface 1112; third surface 1121; and fourth surface 1122.

DETAILED DESCRIPTION

Technical solutions of embodiments of the present disclosure will be described clearly and completely below with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

Terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, a method, a system, a product, or a device including a series of steps or units is not limited to the listed operations or units, it can optionally include other operations or units that are not listed; alternatively, other operations or units inherent to the process, the method, the product, or the device can be included either.

A term "embodiment" or "implementation" referred to herein means that a particular feature, structure, or characteristic described in conjunction with embodiments or implementations may be contained in at least one embodiment of the present disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Reference can be made to FIG. 1, which is a schematic view of a laminated glass assembly provided in an implementation of the present disclosure. A laminated glass assembly 100 is provided in the present disclosure. The laminated glass assembly 100 includes laminated glass 110, a wave transparent layer 120, and a thermal insulation layer 130. The laminated glass 110 has a signal transmission region Q1 and a non-signal transmission region Q2. The wave transparent layer 120 is carried on the laminated glass 110. An orthographic projection of the wave transparent layer 120 on the laminated glass 110 covers the signal transmission region Q1 and the non-signal transmission region Q2. The thermal insulation layer 130 is carried on the laminated glass 110. An orthographic projection of the thermal insulation layer 130 on the laminated glass 110 covers the non-signal transmission region Q2 and avoids the signal transmission region Q1.

The laminated glass assembly 100 is mounted on a vehicle. In an implementation, the laminated glass assembly 100 is mounted as a front windshield of the vehicle. In another implementation, the laminated glass assembly 100 is mounted as a rear window of the vehicle. In the present disclosure, for example, the laminated glass assembly 100 is mounted as the front windshield of the vehicle.

The laminated glass 110 has the signal transmission region Q1 and the non-signal transmission region Q2. A detection signal emitted and/or received by a detector 200 is transmitted through the signal transmission region Q1. A transmittance of the signal transmission region Q1 for the detection signal is relatively high. Preferably, the signal transmission region Q1 has a transmittance of at least 85%, more preferably at least 90%, and even at least 90%, for a detection signal with an angle of incidence of 55°-70°, so as to ensure that the detector 200 in the vehicle can operate normally and have relatively high detection accuracy. The angle of incidence is an angle between an incident detection signal and a normal of the signal transmission region Q1.

Specifically, the wavelength of the detection signal ranges from 380 nm to 1650 nm or from 3 mm to 30 mm. For example, the detector 200 may be a visible-light camera (380 nm-780 nm), a near-infrared camera (780 nm-1650 nm), a LiDAR (also known as light detection and ranging) (905 nm and 1550 nm), or a millimeter-wave radar (3 mm-30 mm), and is used for imaging, ranging, positioning, etc. It may be noted that the number of the signal transmission regions Q1 may be one or more, and may be set according to actual requirements.

Specifically, the detection signal may be circularly polarized light, P-polarized light, or mixed light of P-polarized light and S-polarized light and a proportion of the P-polarized light in the mixed light is greater than or equal to 50%. For a LiDAR, due to high requirements for vehicle safety, the transmittance of the signal transmission region Q1 for a detection signal from the LiDAR must be higher. The angle of incidence of the detection signal is approximately equal to a Brewster's angle of P-polarized light incident onto laminated glass, and preferably, the detection signal from the LiDAR is the P-polarized light or the mixed light with the proportion of the P-polarized light greater than or equal to 80%.

The wave transparent layer 120 is carried on the laminated glass 110. The orthographic projection of the wave transparent layer 120 on the laminated glass 110 covers the signal transmission region Q1. Due to the wave transparent layer 120, the transmittance of the signal transmission region Q1 for the detection signal with the angle of incidence of 55°-70° C. an be improved. The transmittance is measured and calculated according to International Organization for Standardization (ISO) 9050 when the detection signal is incident at the angle of incidence of 55°-70°. Preferably, for the detection signal with the angle of incidence of 55°-70°, the transmittance of the signal transmission region Q1 when the wave transparent layer 120 is present is at least 3%, more preferably at least 5%, even at least 8% higher than the transmittance of the signal transmission region Q1 when the wave transparent layer 120 is absent.

The orthographic projection of the wave transparent layer 120 on the laminated glass 110 further covers the non-signal transmission region Q2. In addition, an area of the orthographic projection of the wave transparent layer 120 on the laminated glass 110 accounts for more than 70%, such as 70%, 80%, 90%, 95%, 100%, etc., of an area of the laminated glass 110. Therefore, after the wave transparent layer 120 is deposited on the laminated glass 110, there is no need to remove a part of the wave transparent layer 120 corresponding to the non-signal transmission region Q2. Therefore, in addition to ensuring that the transmittance of the signal transmission region Q1 for the detection signal is improved, the process difficulty is greatly reduced and the production efficiency is improved.

The thermal insulation layer 130 is carried on the laminated glass 110. The orthographic projection of the thermal insulation layer 130 on the laminated glass 110 covers the non-signal transmission region Q2 and does not cover the signal transmission region Q1. In other words, after the thermal insulation layer 130 is deposited on the laminated glass 110, only a part of the thermal insulation layer 130 corresponding to the signal transmission region Q1 needs to be removed, to ensure that the transmittance of the signal transmission region Q1 for the detector signal is not reduced due to the part of thermal insulation layer 130 corresponding to the signal transmission region Q1. It may be noted that after the thermal insulation layer 130 is deposited on the laminated glass 110 and a coating removal operation is performed, the orthographic projection of the thermal insulation layer 130 on the laminated glass 110 covers the non-signal transmission region Q2 and avoids the signal transmission region Q1. In addition, an area of the orthographic projection of the thermal insulation layer 130 on the laminated glass 110 accounts for more than 70% of the area of the laminated glass 110. The thermal insulation layer 130 reflects or absorbs near-infrared light, so that the non-signal transmission region Q2 of the laminated glass 110 has a heat insulation effect.

An area of an overlap region between the orthographic projection of the wave transparent layer 120 on the laminated glass 110 and the orthographic projection of the thermal insulation layer 130 on the laminated glass 110 accounts for at least 80% of the area of the orthographic projection of the thermal insulation layer 130 on the laminated glass 110. Specifically, the laminated glass 110 has a total solar energy transmittance equal to or less than 53% in the overlap region between the orthographic projection of the wave transparent layer 120 on the laminated glass 110 and the orthographic projection of the thermal insulation layer 130 on the laminated glass 110. The signal transmission region Q1 has a transmittance of at least 85% for a detection signal with a wavelength range of 380 nm-1650 nm or 3 mm-30 mm and an angle of incidence of 55°-70°. Without removing the part of the wave transparent layer 120 corresponding to the non-signal transmission region Q2, the laminated glass 110 can still be ensured to have an effective heat insulation effect.

The laminated glass assembly 100 provided in the present disclosure includes the laminated glass 110, the wave transparent layer 120, and the thermal insulation layer 130. The laminated glass 110 has the signal transmission region Q1 and the non-signal transmission region Q2. The wave transparent layer 120 is carried on the laminated glass 110. The orthographic projection of the wave transparent layer 120 on the laminated glass 110 covers the signal transmission region Q1 and the non-signal transmission region Q2. The thermal insulation layer 130 is carried on the laminated glass 110. The orthographic projection of the thermal insulation layer 130 on the laminated glass 110 covers the non-signal transmission region Q2 and avoids the signal transmission region Q1. For the laminated glass assembly provided in the present disclosure, the part of the thermal insulation layer 130 corresponding to the signal transmission region Q1 is removed, and the wave transparent layer 120 covers the signal transmission region Q1 and the non-signal transmission region Q2. Therefore, in addition to a heat insulation function of the laminated glass assembly 100, the transmittance of the signal transmission region Q1 for the detection signal is also improved, so that the laminated glass assembly 100 in the present disclosure has both the heat insulation function and the local high infrared-light transmittance function.

In an implementation, the laminated glass 110 includes a first transparent substrate 1110, a second transparent substrate 1120, and an adhesive film 1130. The first transparent substrate 1110 has a first surface 1111 and a second surface 1112 opposite to the first surface 1111. The second transparent substrate 1120 has a third surface 1121 and a fourth surface 1122 opposite to the third surface 1121. The third surface 1121 is closer to the second surface 1112 than the fourth surface 1122. The adhesive film 1130 is for adhering the first transparent substrate 1110 and the second transparent substrate 1120.

In this implementation, the intermediate adhesive film 1130 may be polyvinyl butyral (PVB), an ionic adhesive film (e.g., SentryGlass® Plus (SGP)), ethylene vinyl acetate (EVA), polyurethane (PU), or the like, as long as the intermediate adhesive film 1130 can tightly adhere the first transparent substrate 1110 and the second transparent substrate 1120 together.

The following describes an application scenario of the laminated glass 110. When the laminated glass 110 is applied to a vehicle, the laminated glass 110 is mounted on the vehicle at a certain angle of inclination to serve as a windshield. The first transparent substrate 1110 of the laminated glass 110 serves as a substrate of the laminated glass 110 exposed outside the vehicle. The second transparent substrate 1120 serves as a substrate of the laminated glass 110 inside the vehicle.

In an implementation, under ISO 9050, the first transparent substrate 1110 has a vertical visible-light transmittance TL greater than or equal to 88%. In another implementation, under ISO 9050, the first transparent substrate 1110 has the vertical visible-light transmittance TL greater than or equal to 90%. In yet another implementation, under ISO 9050, the first transparent substrate 1110 has the vertical visible-light transmittance TL greater than or equal to 92%. The visible-light transmittance of the laminated glass 110 is ensured, so that a field of view (FOV) is sharper through the laminated glass 110.

For example, the first transparent substrate 1110 may be soda-lime-silica glass, high-alumina glass, borosilicate glass, or the like, and the second transparent substrate 1120 may be high-alumina glass or borosilicate glass. Therefore, the strength of the laminated glass 110 is ensured, and the laminated glass 110 can withstand an impact with a certain strength. Meanwhile, a thickness d1 of the first transparent substrate 1110 satisfies: 1.6 mm≤d1≤4 mm. A thickness d2 of the second transparent substrate 1120 satisfies: 0.3 mm≤d2≤2.3 mm. A total thickness d of the laminated glass 110 after being laminated satisfies: d≥4.2 mm. Therefore, the laminated glass 110 can be ensured to be suitable for different light weight requirements.

In other implementations, the laminated glass 110 has multiple transparent substrates, and correspondingly has multiple adhesive films 1130 to tightly adhere the transparent substrates together. In the present disclosure, for example, the laminated glass 110 has two transparent substrates.

It may be noted that in the present disclosure, a thickness of the wave transparent layer 120 and a thickness of the thermal insulation layer 130 are both in nm level, which cannot be distinguished by human eyes. In addition, the first transparent substrate 1110, the second transparent substrate 1120, the wave transparent layer 120, the thermal insulation layer 130, and the adhesive film 1130 are closed connected without gaps. Therefore, in order to describe the structure of the laminated glass assembly 100 more clearly, in the accompanying drawings of the laminated glass assembly 100 in the present disclosure, the thickness of each component is increased and various components are separated to illustrate the layered structure. The following describes a specific structure of the laminated glass assembly 100.

Figure 2:
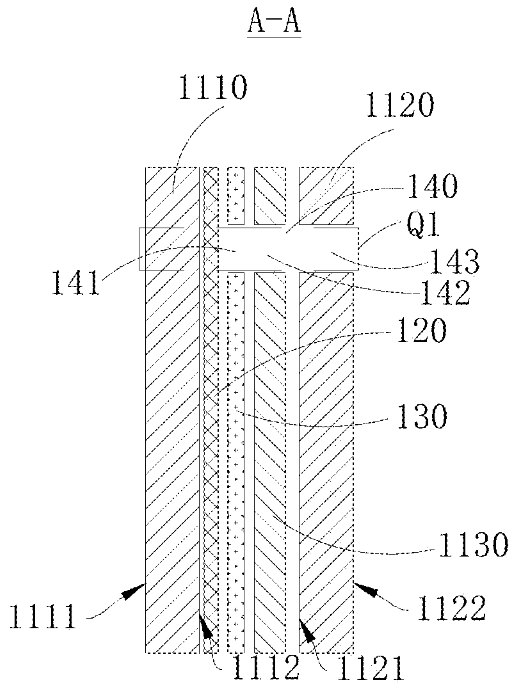
FIG. 2 is a cross-sectional view of a layered structure taken along line A-A in FIG. 1 according to an implementation of the present disclosure.
Figure 3:
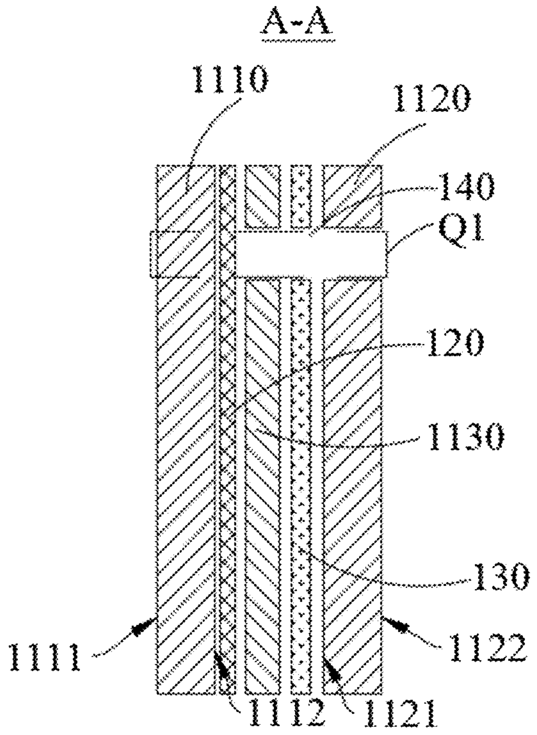
FIG. 3 is a cross-sectional view of a layered structure taken along line A-A in FIG. 1 according to another implementation of the present disclosure.
Figure 4:
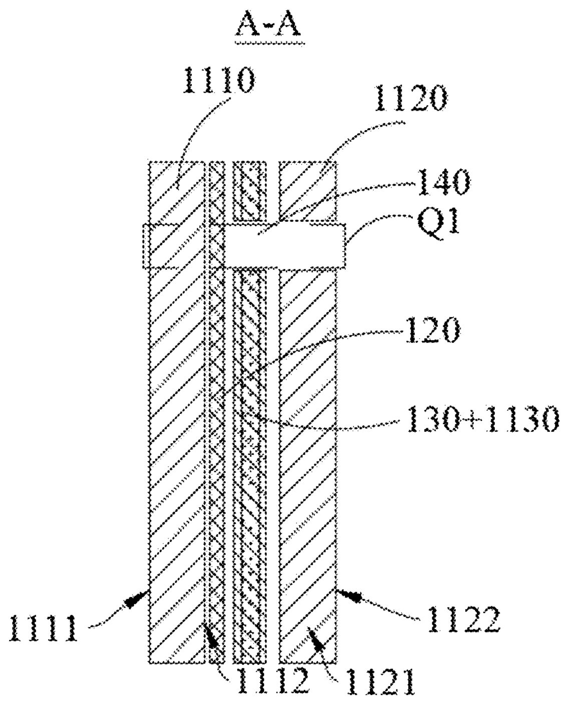
FIG. 4 is a cross-sectional view of a layered structure taken along line A-A in FIG. 1 according to yet another implementation of the present disclosure.

Reference can be to FIG. 1, FIG. 2, FIG. 3, and FIG. 4 together, where FIG. 2 is a cross-sectional view of a layered structure taken along line A-A in FIG. 1 according to an implementation of the present disclosure, FIG. 3 is a cross-sectional view of a layered structure taken along line A-A in FIG. 1 according to another implementation of the present disclosure, and FIG. 4 is a cross-sectional view of a layered structure taken along line A-A in FIG. 1 according to yet another implementation of the present disclosure. In an implementation, the second transparent substrate 1120, the adhesive film 1130, and the thermal insulation layer 130 all define through holes 140 in communication with one another. At least a part of each of the through holes 140 is located in the signal transmission region Q1. In other words, the thermal insulation layer 130 defines a first through hole 141, the adhesive film 1130 defines a second through hole 142, and the second transparent hole 1120 defines a third through hole 143. The through holes 140 include the first through hole 141, the second through hole 142, and the third through hole 143. The first through hole 141, the second through hole 142, and the third through hole 143 are in communication with each other. At least part of each of the first through hole 141, the second through hole 142, and the third through hole 143 is located in the signal transmission region Q1. The wave transparent layer 120 is disposed on the second surface 1112. The thermal insulation layer 130 is disposed on a surface of the wave transparent layer 120 close to the second transparent substrate 1120 (as illustrated in FIG. 2), or the thermal insulation layer 130 is disposed on the third surface 1121 (as illustrated in FIG. 3), or the thermal insulation layer 130 is disposed in the adhesive film 1130 (as illustrated in FIG. 4).

In this implementation, at least the part of each through hole 140 is located in the signal transmission region Q1. In other words, the through hole 140 may be not only located in the signal transmission region Q1 but also located in the non-signal transmission region Q2. The detection signal from the detector 200 is transmitted through the through hole 140, the wave transparent layer 120, and the first transparent substrate 1110, but is not transmitted through the second transparent substrate 1120, the adhesive film 1130, and the thermal insulation layer 130. Therefore, the second transparent substrate 1120, the adhesive film 1130, and the thermal insulation layer 130 are avoided from blocking the detection signal. The selection of the second transparent substrate 1120, the adhesive film 1130, and the thermal insulation layer 130 is freer. For example, the second transparent substrate 1120 may be tinted glass. The adhesive film 1130 may be an adhesive film with a heat insulation performance. The thermal insulation layer 130 may be a thermal insulation layer with a higher performance. Therefore, the product mix of the laminated glass is more diversified.

In this implementation, the wave transparent layer 120 is disposed on the second surface 1112. The wave transparent layer 120 having a high signal transmission function may be deposited on the second surface 1112 by means of physical vapor deposition (PVD), chemical vapor deposition (CVD), or the like, thereby improving the transmittance of the signal transmission region Q1 for the detection signal.

In this implementation, the thermal insulation layer 130 is disposed on the surface of the wave transparent layer 120 close to the second transparent substrate 1120 (as illustrated in FIG. 2), or the thermal insulation layer 130 is disposed on the third surface 1121 (as illustrated in FIG. 3), or the thermal insulation layer 130 is disposed in the adhesive film 1130 (as illustrated in FIG. 4). The thermal insulation layer 130 may be directly deposited on the surface of the wave transparent layer 120 close to the second transparent substrate 1120 or on the third surface 1121 by means of PVD, CVD, sol-gel spraying, or the like. Alternatively, the thermal insulation layer 130 may be deposited on the polymer film, such as polyethylene terephthalate (PET), and then interlaid into the adhesive film 1130 as a part of the adhesive film 1130.

The following are implementations of the orthographic projection of the thermal insulation layer 130 on the laminated glass 110 avoiding the signal transmission region Q1.

In an implementation, firstly, the thermal insulation layer 130 may be deposited on the surface of the wave transparent layer 120 close to the second transparent substrate 1120 or on the third surface 1121, or the thermal insulation layer 130 may be deposited on a polymer film and then interlaid into the adhesive film 1130 as the part of the adhesive film 1130. Then, the part of the thermal insulation layer 130 corresponding to the signal transmission region Q1 is removed. In another implementation, firstly, a part of the surface of the wave transparent layer 120, close to the second transparent substrate 1120 and corresponding to the signal transmission region Q1, is covered by a masking layer, or a part of the third surface 1121 corresponding to the signal transmission region Q1 is covered by the masking layer. Then, the thermal insulation layer 130 is deposited on the surface of the wave transparent layer 120 close to the second transparent substrate 1120 or on the third surface 1121. Finally, the masking layer is removed. Alternatively, firstly, a part of the polymer film corresponding to the signal transmission region Q1 is covered by the masking layer. Then after the thermal insulation layer 130 is deposited on the polymer film, the masking layer is removed. Finally, the thermal insulation layer 130 is interlaid into the adhesive film 1130. Therefore, the heat insulation effect of the laminated glass 110 can be maintained without affecting the transmittance of the signal transmission region Q1 for the detection signal.

In this implementation, the wave transparent layer 120 is configured to improve the transmittance of the signal transmission region Q1 for the detection signal with the angle of incidence of 55°-70°. The wave transparent layer 120 has at least one laminated structure including a high refractive-index layer and a low refractive-index layer. The high refractive-index layer has a refractive index of 1.9-2.6. The low refractive-index layer has a refractive index of 1.3-1.8. With the design of the at least one laminated structure including the high refractive-index layer and the low refractive-index layer, the transmittance is improved. The high refractive-index layer may have multiple sub-layers, and/or the low refractive-index layer may also have multiple sub-layers. The high refractive-index layer and the low refractive-index layer are different in at least one of a material of each sub-layer, a thickness of each sub-layer, or a refractive index of each sub-layer. The thermal insulation layer 130 is configured to reflect and/or absorb infrared light, so that the laminated glass has a good heat insulation effect. The thermal insulation layer 130 includes at least one of metallic silver layer, a silver alloy layer, or a transparent conductive oxide (TCO) layer. The metallic silver layer, the silver alloy layer, or the TCO layer has a good infrared-light reflection performance, thereby reducing the transmittance of the laminated glass for infrared light. The material of the silver alloy layer is preferably made of a silver-copper alloy, a silver-indium alloy, a silver-gold alloy, etc. A silver content in the silver alloy layer is preferably greater than or equal to 95%, more preferably greater than or equal to 98%. The TCO layer includes at least one TCO layer, preferably made of indium-doped tin oxide (ITO), fluorine-doped tin oxide (FTO), antimony-doped tin oxide (ATO), aluminum-doped zinc oxide (AZO), indium-doped zinc oxide (IZO), gallium-doped zinc oxide (GZO), etc. The thermal insulation layer 130 may further include other dielectric layers.

In the related art, in order to additionally dispose a signal transmission region capable of improving a signal transmittance on thermal insulation glass, implementations are usually as follows. After a wave transparent layer is deposited on the whole surface of glass by means of magnetron sputtering, a part of the wave transparent layer deposited corresponding to a non-signal transmission region is removed. Alternatively, firstly, a part of the glass corresponding to the non-signal transmission region is covered by a masking layer, then the wave transparent layer is deposited on the glass, and finally, the masking layer is removed. However, since the area of the orthographic projection of the non-signal transmission region on the glass accounts for more than 80% of the area of the region where the glass is located, in the related art, an additional coating removal process for the signal transmission region with a small area proportion is not ideal in terms of production efficiency and process complexity. As a result, the quality cost of the batch production process remains high.

Compared to the related art, for example, specifically (as illustrated in FIG. 2), under ISO 9050, a vertical visible-light transmittance TL of the first transparent substrate 1110 is 89.9%. $ZnSnO_x$ with a thickness of 92 nm, $TiO_x$ with a thickness of 7 nm, $SiO_2$ with a thickness of 117 nm, and $TiO_x$ with a thickness of 25 nm are sequentially deposited on the second surface 1112 to form the wave transparent layer 120. Then, on the surface of the wave transparent layer 120 close to the second transparent substrate 1120, AZO with a thickness of 11 nm, Ag with a thickness of 12.8 nm, $TiO_x$ with a thickness of 9 nm, $ZnSnO_x$ with a thickness of 60 nm, AZO with a thickness of 20 nm, Ag with a thickness of 9.2 nm, $TiO_x$ with a thickness of 9 nm, AZO with a thickness of 8 nm, $ZnSnO_x$ with a thickness of 10 nm, and $Si_3N_4$ with a thickness of 10 nm are sequentially deposited, to form the thermal insulation layer 130. In addition, a part of the thermal insulation layer 130 corresponding to the signal transmission region Q1 is removed. Experimental tests are performed on the laminated glass assembly 100 that is mounted on a vehicle 1 at an angle α of 60°. A vertical visible-light transmittance TL of the laminated glass assembly 100 is 75.6% in the overlap region between the orthographic projection of the wave transparent layer 120 on the laminated glass 110 and the orthographic projection of the thermal insulation layer 130 on the laminated glass 110. The laminated glass assembly 100 has a reflectivity RL of 14.1% for visible light incident onto the fourth surface 1122 in the overlap region between the orthographic projection of the wave transparent layer 120 on the laminated glass 110 and the orthographic projection of the thermal insulation layer 130 on the laminated glass 110. The laminated glass assembly 100 has a total solar energy transmittance TTS of 51.3% in the overlap region between the orthographic projection of the wave transparent layer 120 on the laminated glass 110 and the orthographic projection of the thermal insulation layer 130 on the laminated glass 110. According to International Commission on Illumination (CIE) 1976 standard, a color value expression formula of the laminated glass assembly 100 in the overlap region between the orthographic projection of the wave transparent layer 120 on the laminated glass 110 and the orthographic projection of the thermal insulation layer 130 on the laminated glass 110 is $L^*=43.8$, $a^*=-1.8$, and $b^*=-9.8$, and the laminated glass assembly 100 presents a light blue appearance. For a detection signal with a wavelength of 905 nm and an angle of incidence of 60°, a transmittance Ts1 of the signal transmission region Q1 is 87.04%, which is increased by 5.54% compared to a transmittance Ts2 of a signal transmission region Q1 without depositing the wave transparent layer 120. It can be concluded from experimental tests that in this implementation, the heat can be effectively insulated due to the arrangement of the thermal insulation layer 130, the transmittance of the signal transmission region Q1 for the signal can be effectively improved due to the arrangement of the wave transparent layer 120, and a color appearance that can be comfortable to human eyes, such as light blue, can also be presented due to the overlap arrangement between the thermal insulation layer 130 and the wave transparent layer 120.

In this implementation (as illustrated in FIG. 2), only the part of the thermal insulation layer 130 corresponding to the signal transmission region Q1 needs to be removed, and the part of the wave transparent layer 120 corresponding to the non-signal transmission region Q2 does not need to be removed, so that the manufacturing process is simpler. Therefore, the laminated glass assembly 100 in the present disclosure has both the heat insulation function and the local high infrared-light transmittance function, and is manufactured with high efficiency. Meanwhile, in this implementation, a part of the wave transparent layer 120 can serve as a base of the thermal insulation layer 130. During processing and forming of the laminated glass assembly 100, the wave transparent layer 120 can effectively prevent alkali metal ions in the first transparent substrate 1110 from freeing into the thermal insulation layer 130. Therefore, there is no need to additionally dispose a base film layer to protect the thermal insulation layer, and the heat insulation function of the thermal insulation layer 130 can be ensured not to be impaired during the manufacturing process of the laminated glass 100. Further, the wave transparent layer 120 can also play a role of color adjustment. A process of sequentially and continuously depositing the wave transparent layer 120 and the thermal insulation layer 130 on the second surface 1112 is efficient and simple, so that the laminated glass assembly 100 has both the heat insulation function and the local high infrared-light transmittance function, and is manufactured with high efficiency.

Figure 5:
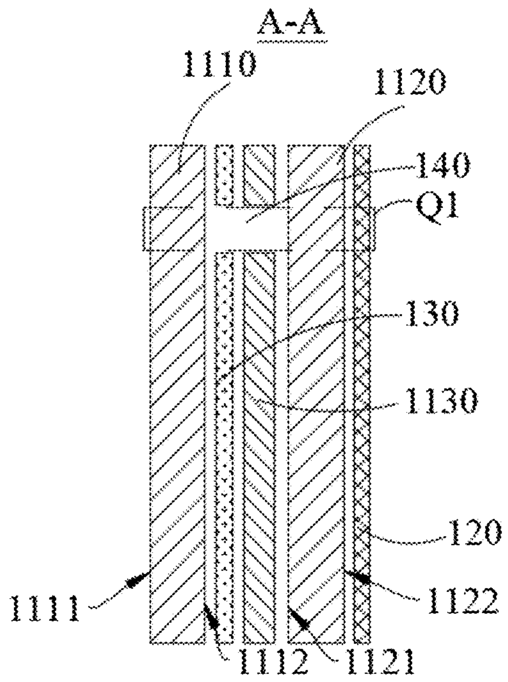
FIG. 5 is a cross-sectional view of a layered structure taken along line A-A in FIG. 1 according to yet another implementation of the present disclosure.
Figure 6:
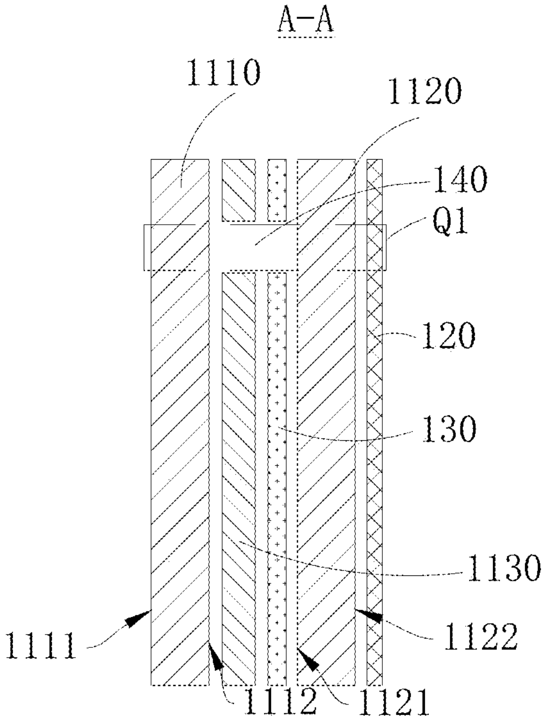
FIG. 6 is a cross-sectional view of a layered structure taken along line A-A in FIG. 1 according to yet another implementation of the present disclosure.
Figure 7:
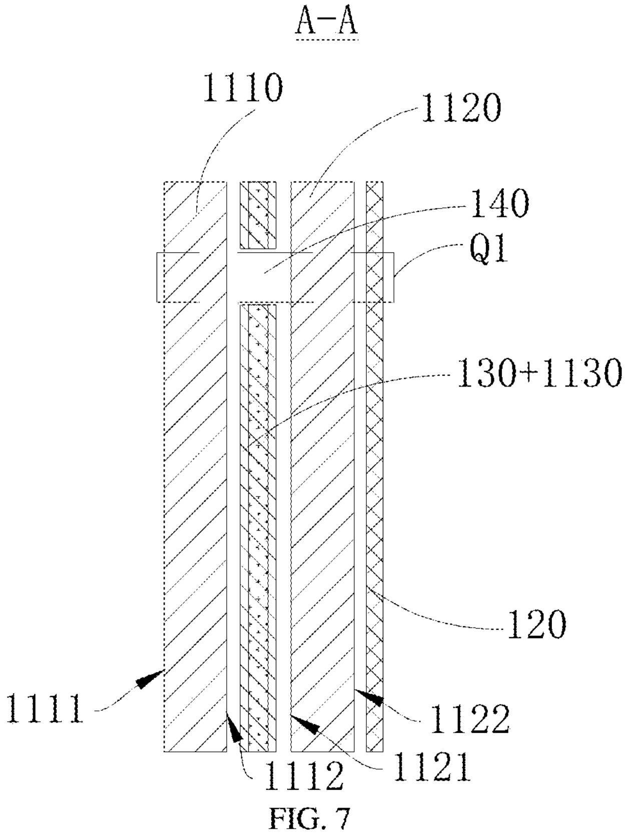
FIG. 7 is a cross-sectional view of a layered structure taken along line A-A in FIG. 1 according to yet another implementation of the present disclosure.

Reference can be made to FIG. 1, FIG. 5, FIG. 6, and FIG. 7 together, where FIG. 5 is a cross-sectional view of a layered structure taken along line A-A in FIG. 1 according to yet another implementation of the present disclosure, FIG. 6 is a cross-sectional view of a layered structure taken along line A-A in FIG. 1 according to yet another implementation of the present disclosure, and FIG. 7 is a cross-sectional view of a layered structure taken along line A-A in FIG. 1 according to yet another implementation of the present disclosure. In another implementation, the thermal insulation layer 130 and the adhesive film 1130 both define through holes 140 in communication with each other. At least a part of each of the through holes 140 is located in the signal transmission region Q1. In other words, the thermal insulation layer 130 defines a first through hole 141 and the adhesive film 1130 defines a second through hole 142. The through holes 140 include the first through hole 141 and the second through hole 142. The first through hole 141 and the second through hole 142 are in communication with each other. At least part of each of the first through hole 141 and the second through hole 142 is located in the signal transmission region Q1. The wave transparent layer 120 is disposed on the fourth surface 1122. The thermal insulation layer 130 is disposed on the second surface 1112 (as illustrated in FIG. 5), or the thermal insulation layer 130 is disposed on the third surface 1121 (as illustrated in FIG. 6), or the thermal insulation layer 130 is disposed in the adhesive film 1130 (as illustrated in FIG. 7).

In this implementation, at least a part of each through hole 140 is located in the signal transmission region Q1. In other words, the through hole 140 may be not only located in the signal transmission region Q1 but also located in the non-signal transmission region Q2. The detection signal from the detector 200 is transmitted through the wave transparent layer 120, the second transparent substrate 1120, the through hole 140, and the first transparent substrate 1110, but is not transmitted through the adhesive film 1130 and the thermal insulation layer 130. Therefore, the adhesive film 1130 and the thermal insulation layer 130 are avoided from blocking the detection signal.

In this implementation, the wave transparent layer 120 is disposed on the fourth surface 1122. The wave transparent layer 120 having the high signal transmission function may be deposited on the fourth surface 1122 by means of PVD, CVD, or the like, thereby improving the transmittance of the signal transmission region Q1 for the detection signal.

In this implementation, the thermal insulation layer 130 is disposed on the second surface 1112 (as illustrated in FIG. 5), or the thermal insulation layer 130 is disposed on the third surface 1121 (as illustrated in FIG. 6), or the thermal insulation layer 130 is disposed in the adhesive film 1130 (as illustrated in FIG. 7). The thermal insulation layer 130 may be directly deposited on the second surface 1112 or the third surface 1121 by means of PVD, CVD, sol gel spraying, or the like. Alternatively, the thermal insulation layer 130 may be deposited on the polymer film, such as PET, and then interlaid into the adhesive film 1130 as a part of the adhesive film 1130.

The following are implementations of the orthographic projection of the thermal insulation layer 130 on the laminated glass 110 avoiding the signal transmission region Q1. In an implementation, firstly, the thermal insulation layer 130 may be deposited on the second surface 1112 or the third surface 1121, or the thermal insulation layer 130 may be deposited on the polymer film and then interlaid into the adhesive film 1130 as the part of the adhesive film 1130. Then, the part of the thermal insulation layer 130 corresponding to the signal transmission region Q1 is removed. In another implementation, firstly, a part of the second surface 1112 or a part of the third surface 1121 corresponding to the signal transmission region Q1 is covered by a masking layer. Then, the thermal insulation layer 130 is deposited on the second surface 1112 or the third surface 1121. Finally, the masking layer is removed. Alternatively, firstly, a part of the polymer film corresponding to the signal transmission region Q1 is covered by the masking layer. Then after the thermal insulation layer 130 is deposited on the polymer film, the masking layer is removed. Finally, the thermal insulation layer 130 is interlaid into the adhesive film 1130. Therefore, the heat insulation effect of the laminated glass 110 can be maintained without affecting the transmittance of the laminated glass 110 for the signal in the signal transmission region Q1.

Figure 8:
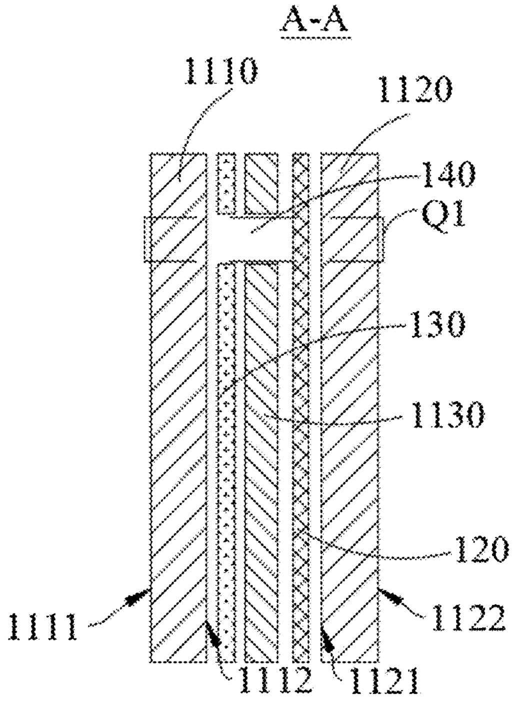
FIG. 8 is a cross-sectional view of a layered structure taken along line A-A in FIG. 1 according to yet another implementation of the present disclosure.
Figure 9:
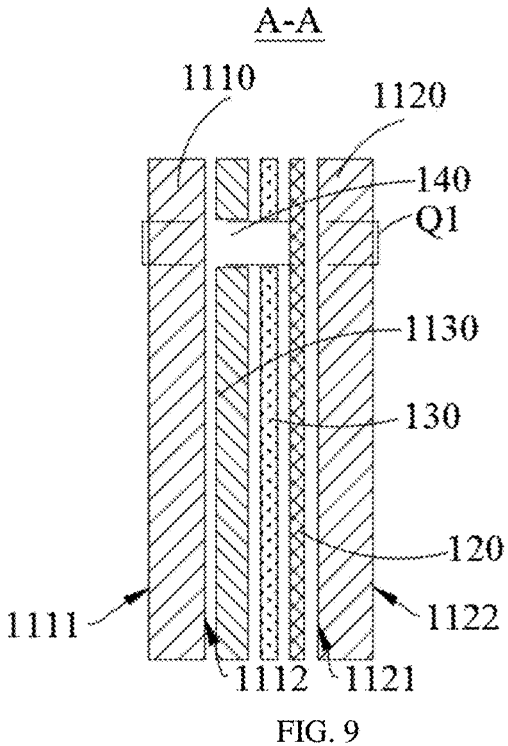
FIG. 9 is a cross-sectional view of a layered structure taken along line A-A in FIG. 1 according to yet another implementation of the present disclosure.
Figure 10:
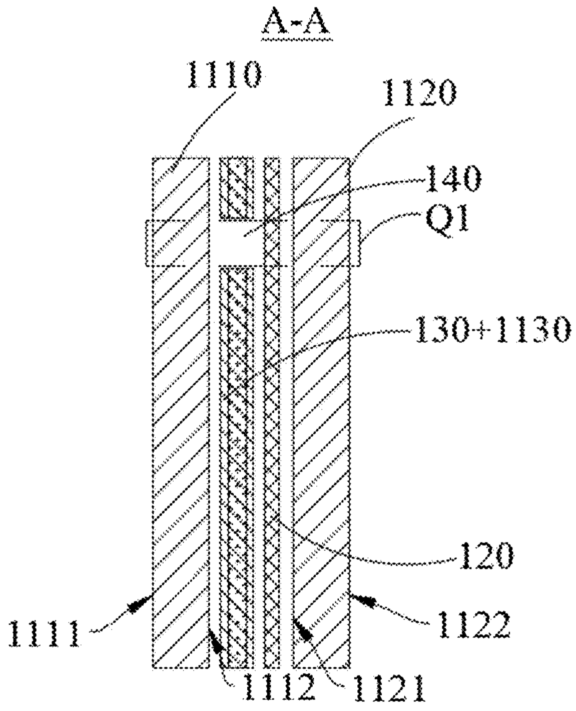
FIG. 10 is a cross-sectional view of a layered structure taken along line A-A in FIG. 1 according to yet another implementation of the present disclosure.

Reference can be made to FIG. 1, FIG. 8, FIG. 9, and FIG. 10 together, where FIG. 8 is a cross-sectional view of a layered structure taken along line A-A in FIG. 1 according to yet another implementation of the present disclosure, FIG. 9 is a cross-sectional view of a layered structure taken along line A-A in FIG. 1 according to yet another implementation of the present disclosure, and FIG. 10 is a cross-sectional view of a layered structure taken along line A-A in FIG. 1 according to yet another implementation of the present disclosure. In another implementation, the thermal insulation layer 130 and the adhesive film 1130 both define through holes 140 in communication with each other. At least a part of each of the through holes 140 is located in the signal transmission region Q1. In other words, the thermal insulation layer 130 defines a first through hole 141 and the adhesive film 1130 defines a second through hole 142. The through holes 140 include the first through hole 141 and the second through hole 142. The first through hole 141 and the second through hole 142 are in communication with each other. At least part of each of the first through hole 141 and the second through hole 142 is located in the signal transmission region Q1. The wave transparent layer 120 is disposed on the third surface 1121. The thermal insulation layer 130 is disposed on the second surface 1112 (as illustrated in FIG. 8), or the thermal insulation layer 130 is disposed on a surface of the wave transparent layer 120 close to the first transparent substrate 1110 (as illustrated in FIG. 9), or the thermal insulation layer 130 is disposed in the adhesive film 1130 (as illustrated in FIG. 10).

In this implementation, at least a part of each through hole 140 is located in the signal transmission region Q1. In other words, the through hole 140 may be not only located in the signal transmission region Q1 but also located in the non-signal transmission region Q2. The detection signal from the detector 200 is transmitted through the second transparent substrate 1120, the wave transparent layer 120, the through hole 140, and the first transparent substrate 1110, but is not transmitted through the adhesive film 1130 and the thermal insulation layer 130. Therefore, the adhesive film 1130 and the thermal insulation layer 130 are avoided from blocking the detection signal.

In this implementation, the wave transparent layer 120 is disposed on the third surface 1121. The wave transparent layer 120 having the high signal transmission function may be deposited on the third surface 1121 by means of PVD, CVD, or the like, thereby improving the transmittance of the detection signal of the signal transmission region Q1.

In this implementation, the thermal insulation layer 130 is disposed on the second surface 1112 (as illustrated in FIG. 8), or the thermal insulation layer 130 is disposed on the surface of the wave transparent layer 120 close to the first transparent substrate 1110 (as illustrated in FIG. 9), or the thermal insulation layer 130 is disposed in the adhesive film 1130 (as illustrated in FIG. 10). The thermal insulation layer 130 may be directly deposited on the second surface 1112 or the surface of the wave transparent layer 120 close to the first transparent substrate 1110 by means of PVD, CVD, sol-gel spraying, or the like. Alternatively, the thermal insulation layer 130 may be deposited on the polymer film, such as PET, and then interlaid into the adhesive film 1130 as a part of the adhesive film 1130.

The following are implementations of the orthographic projection of the thermal insulation layer 130 on the laminated glass 110 avoiding the signal transmission region Q1. In an implementation, firstly, the thermal insulation layer 130 may be deposited on the second surface 1112 or the surface of the wave transparent layer 120 close to the first transparent substrate 1110, or the thermal insulation layer 130 may be deposited on the polymer film and then interlaid into the adhesive film 1130 as the part of the adhesive film 1130. Then, the part of the thermal insulation layer 130 corresponding to the signal transmission region Q1 is removed. In another implementation, firstly, a part of the second surface 1112 corresponding to the signal transmission region Q1 is covered by the masking layer, or a part of the surface of the wave transparent layer 120, close to the first transparent substrate 1110 and corresponding to the signal transmission region Q1, is covered by the masking layer. Then, the thermal insulation layer 130 is deposited on the second surface 1112 or on the surface of the wave transparent layer 120 close to the first transparent substrate 1110. Finally, the masking layer is removed. Alternatively, firstly, a part of the polymer film corresponding to the signal transmission region Q1 is covered by the masking layer. Then after the thermal insulation layer 130 is deposited on the polymer film, the masking layer is removed. Finally, the thermal insulation layer 130 is interlaid into the adhesive film 1130. Therefore, the heat insulation effect of the laminated glass 110 can be maintained without affecting the transmittance of the signal transmission region Q1 for the detection signal.

Figure 11:
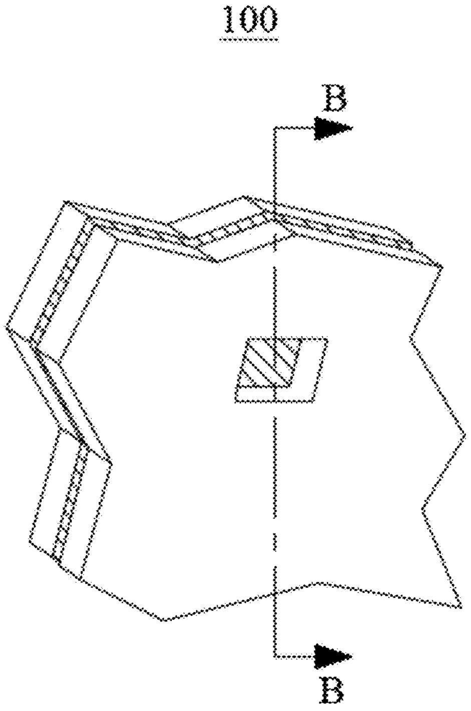
FIG. 11 is a schematic view of a laminated glass assembly provided in another implementation of the present disclosure.
Figure 12:
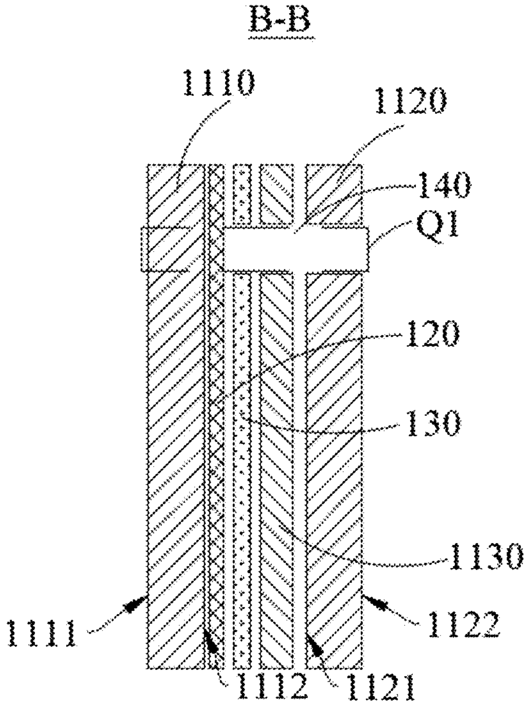
FIG. 12 is a schematic cross-sectional view taken along line B-B in FIG. 11 according to an implementation of the present disclosure.
Figure 13:
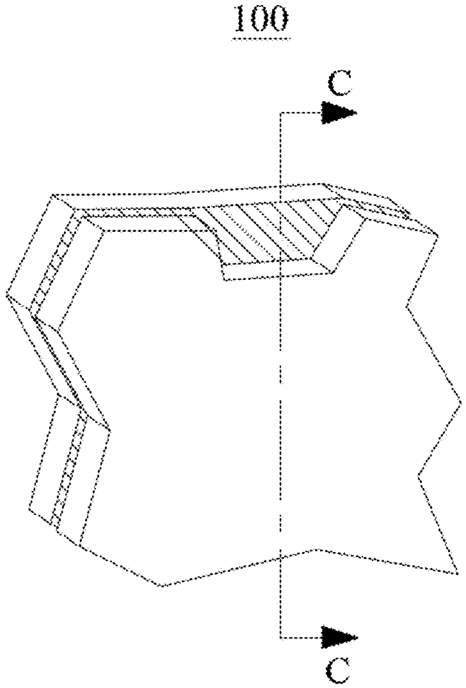
FIG. 13 is a schematic view of a laminated glass assembly provided in yet another implementation of the present disclosure.
Figure 14:
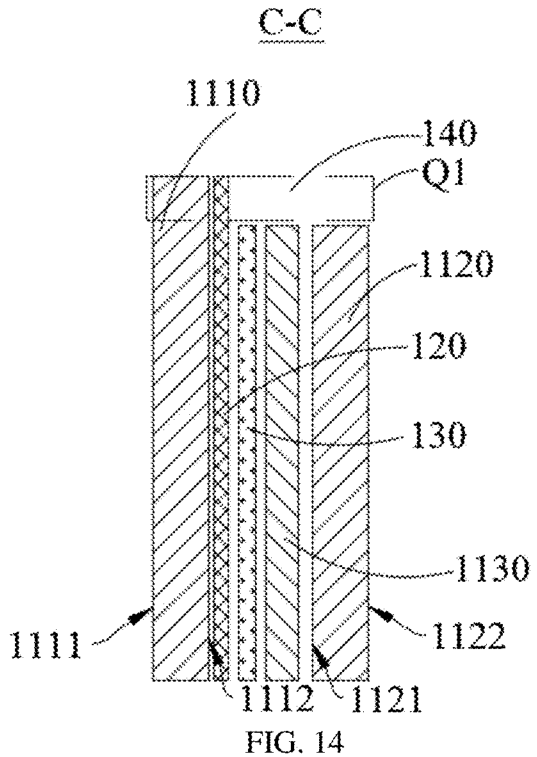
FIG. 14 is a schematic cross-sectional view taken along line C-C in FIG. 13 according to an implementation of the present disclosure.

Reference can be made to FIG. 11, FIG. 12, FIG. 13, and FIG. 14 together, where FIG. 11 is a schematic view of a laminated glass assembly provided in another implementation of the present disclosure, FIG. 12 is a schematic cross-sectional view taken along line B-B in FIG. 11 according to an implementation of the present disclosure, FIG. 13 is a schematic view of a laminated glass assembly provided in yet another implementation of the present disclosure, and FIG. 14 is a schematic cross-sectional view taken along line C-C in FIG. 13 according to an implementation of the present disclosure. In an implementation, the through holes 140 are defined in an inner region (as illustrated in FIG. 11 and FIG. 12) or at an edge (as illustrated in FIG. 13 and FIG. 14) of the laminated glass assembly 100. An area S of an orthographic projection of the signal transmission region Q1 on the second surface 1112 satisfies: S≥50 mm*80 mm.

In this implementation, according to actual requirements, the through holes 140 may be defined in the inner region or at the edge of the laminated glass assembly 100. The signal transmission region Q1 is disposed corresponding to the through holes 140, and the area S of the orthographic projection of the signal transmission region Q1 on the second surface satisfies: S≥50 mm*80 mm. Generally, a detector 200 needs to be placed in the signal transmission region Q1 to emit and receive a detection signal. The area S of the orthographic projection of the signal transmission region Q1 on the second surface 1112 satisfies: S≥50 mm*80 mm, which can ensure that a sufficient detection surface is used for penetration of the signal in the signal transmission region Q1.

Figure 15:
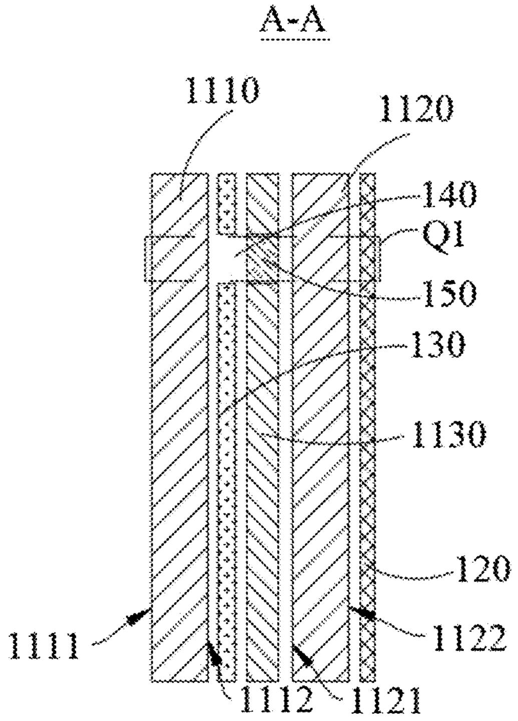
FIG. 15 is a cross-sectional view of a layered structure of a filler additionally disposed in FIG. 5 according to an implementation of the present disclosure.
Figure 16:
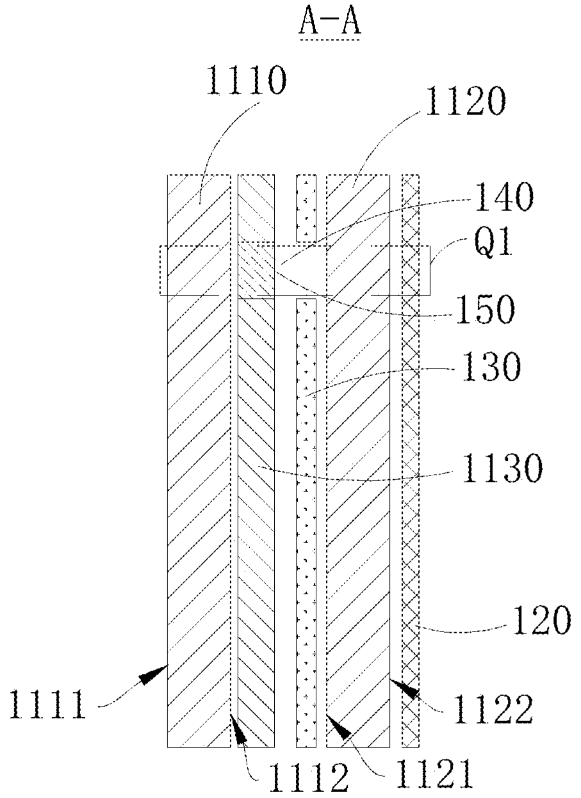
FIG. 16 is a cross-sectional view of a layered structure of a filler additionally disposed in FIG. 6 according to an implementation of the present disclosure.

Reference can be made to FIG. 15 and FIG. 16, where FIG. 15 is a cross-sectional view of a layered structure of a filler additionally disposed in FIG. 5 according to an implementation of the present disclosure, and FIG. 16 is a cross-sectional view of a layered structure of a filler additionally disposed in FIG. 6 according to an implementation of the present disclosure. In an implementation, a through hole 140 of the adhesive film 1130 is filled with a filler 150. The filler 150 has a blocking rate of no more than 2% for a vertically incident detection signal with a wavelength range of 380 nm-1650 nm or 3 mm-30 mm. The filler 150 has a blocking rate of no more than 5% for a detection signal with a wavelength range of 380 nm-1650 nm or 3 mm-30 mm and an angle of incidence of 55°-70°. Therefore, a high transmittance of the signal transmission region Q1 for the detection signal is ensured.

In this implementation, a material of the filler 150 may be the same as or different from a material of the adhesive film 1130. Preferably, for the detection signal with the angle of incidence of 55°-70°, the blocking rate of the filler 150 is less than a blocking rate of the adhesive film 1130. Therefore, the overall strength of the laminated glass is improved, and an influence of the filler 150 on the transmittance of the signal transmission region Q1 for the detection signal is reduced as much as possible.

Figure 17:
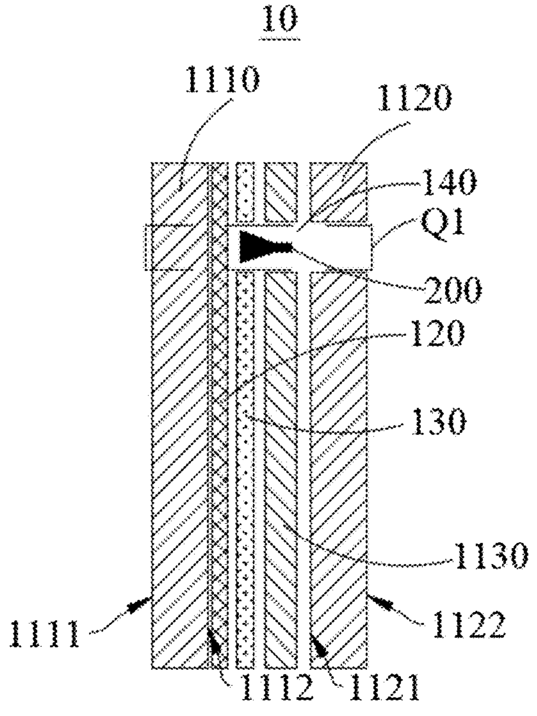
FIG. 17 is a schematic view of a signal transmission system provided in an implementation of the present disclosure.
Figure 18:
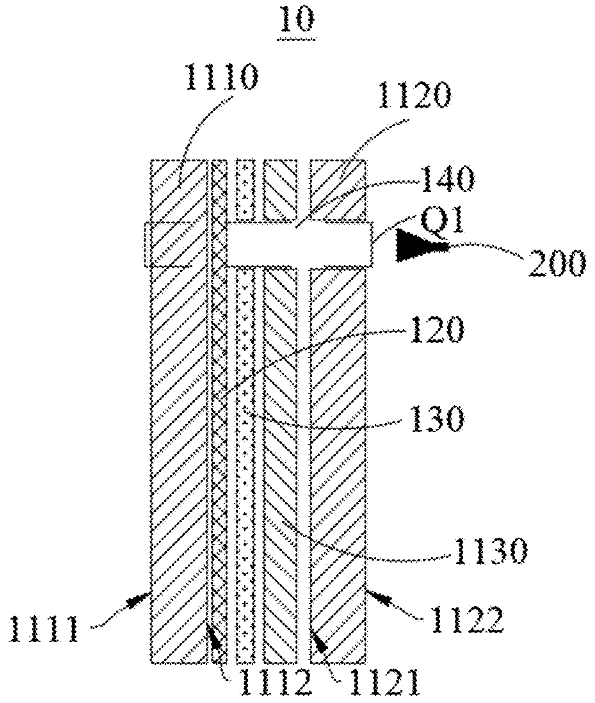
FIG. 18 is a schematic view of a signal transmission system provided in another implementation of the present disclosure.
Figure 19:
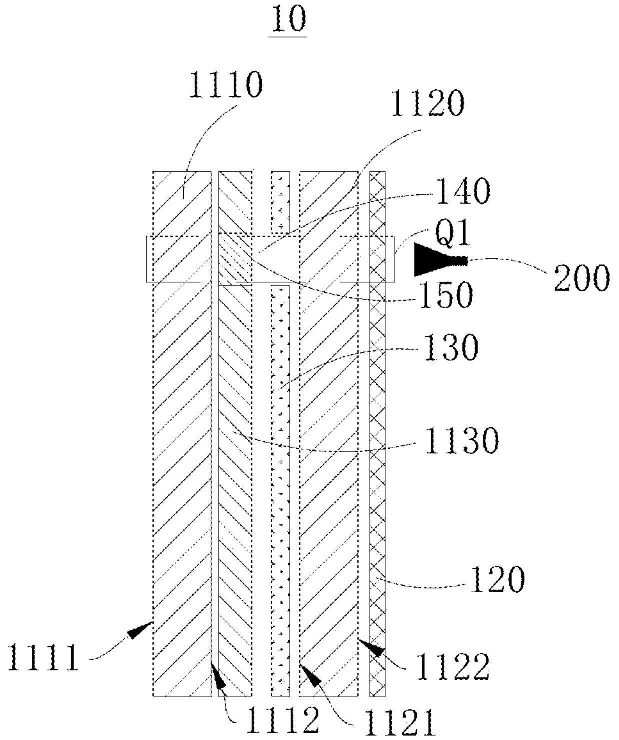
FIG. 19 is a schematic view of a signal transmission system provided in yet another implementation of the present disclosure.

Reference can be made to FIG. 17, FIG. 18, and FIG. 19 together, where FIG. 17 is a schematic view of a signal transmission system provided in an implementation of the present disclosure, FIG. 18 is a schematic view of a signal transmission system provided in another implementation of the present disclosure, and FIG. 19 is a schematic view of a signal transmission system provided in yet another implementation of the present disclosure. A signal transmission system 10 is further provided in the present disclosure. The signal transmission system 10 includes a detector 200 and the above laminated glass assembly 100. The detector 200 is disposed corresponding to the signal transmission region Q1. A detection signal emitted and/or received by the detector 200 passes through the signal transmission region Q1. A wavelength of the detection signal is ranges from 380 nm to 1650 nm or from 3 mm to 30 mm. The detection signal is incident into the signal transmission region Q1 at an angle of incidence of 55°-70°.

In an implementation, when the second transparent substrate 1120, the adhesive film 1130, and present disclosure 130 all define through holes 140 in communication with one another, the detector 200 is disposed in at least one of the through holes 140 (as illustrated in FIG. 17). A distance d between the detector 200 and the second surface 1112 satisfies: 0 mm≤d≤1 mm. Alternatively, the detector 200 is disposed at one side of the second transparent substrate 1120 away from the first transparent substrate 1110 (as illustrated in FIG. 18). A distance d between the detector 200 and the fourth surface 1122 satisfies: 0 mm≤d≤25 mm.

In another implementation, when only the adhesive film 1130 and the thermal insulation layer 130 both define through holes 140 in communication with each other, the detector 200 is disposed at one side of the second transparent substrate 1120 away from the first transparent substrate 1110 (as illustrated in FIG. 19). The distance d between the detector 200 and the fourth surface 1122 satisfies: 0 mm≤d≤25 mm.

Figure 20:
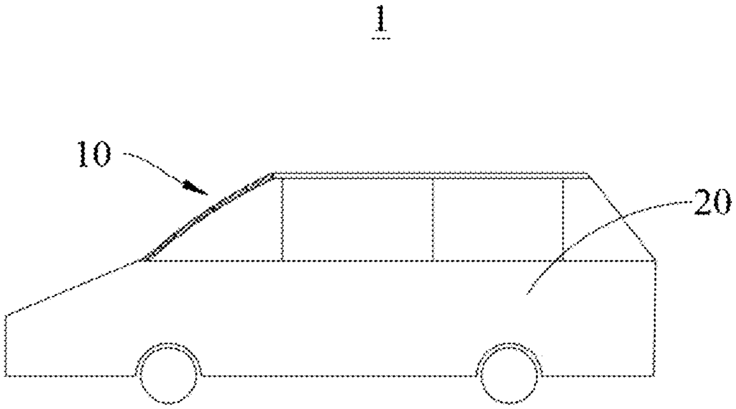
FIG. 20 is a schematic view of a vehicle provided in an implementation of the present disclosure.
Figure 21:
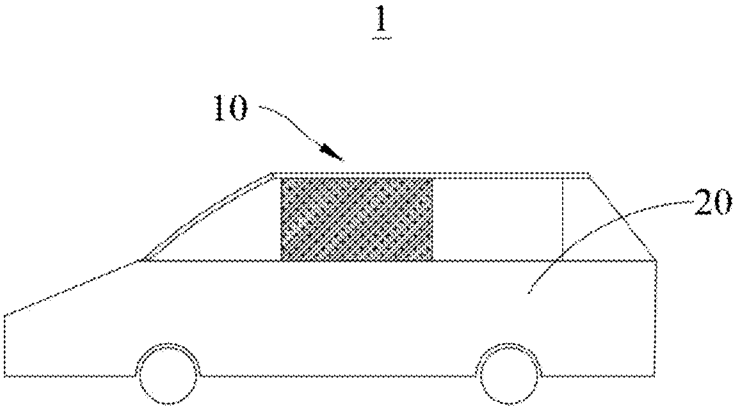
FIG. 21 is a schematic view of a vehicle provided in another implementation of the present disclosure.
Figure 22:
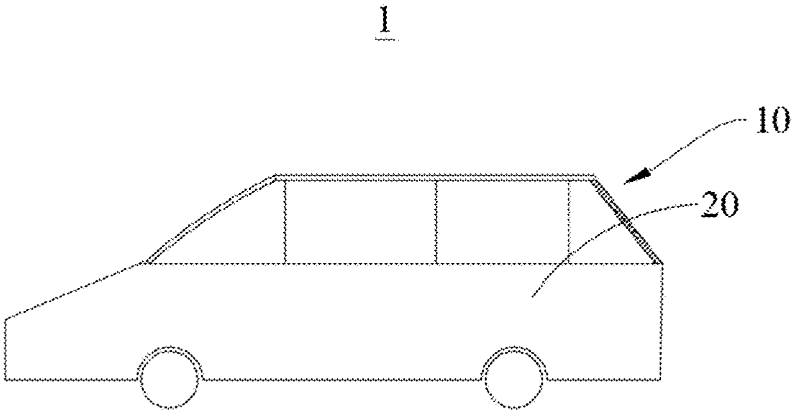
FIG. 22 is a schematic view of a vehicle provided in yet another implementation of the present disclosure.

Reference can be made to FIG. 20, FIG. 21, and FIG. 22 together, where FIG. 20 is a schematic view of a vehicle provided in an implementation of the present disclosure, and FIG. 21 is a schematic view of a vehicle provided in another implementation of the present disclosure, and FIG. 22 is a schematic view of a vehicle provided in yet another implementation of the present disclosure. A vehicle 1 is further provided in the present disclosure. The vehicle 1 includes a vehicle body 20 and the above signal transmission system 10. The signal transmission system 10 is carried on the vehicle body 20. The signal transmission system 10 may be, but is not limited to, mounted at the front (as illustrated in FIG. 20), the side (as illustrated in FIG. 21), or the rear (as illustrated in FIG. 22) of the vehicle body 20. When the signal transmission system 10 is mounted at the front of the vehicle body 20, the laminated glass assembly 100 can serve as a front windshield, and an angle α at which the laminated glass assembly 100 is mounted satisfies: 55°≤α≤70°.

In this implementation, the vehicle 1 may be, but is not limited to, a sedan, a multi-purpose vehicle (MPV), a sport/suburban utility vehicle (SUV), an off-road vehicle (ORV), a pickup, a van, a bus, a truck, and the like. The vehicle 1 equipped with one or more signal transmission systems 10 has functions such as imaging, ranging, and positioning, so that the vehicle 1 can detect obstacles near the vehicle during parking or driving.

Although embodiments of the present disclosure have been illustrated and described above, it can be understood that the above embodiments are exemplary and cannot be understood as limitations to the present disclosure. Those of ordinary skill in the art can change, amend, replace, and modify the above embodiments within the scope of the present disclosure, and these modifications and improvements are also regarded as the protection scope of the present disclosure.

What is claimed is:

1. A laminated glass assembly, comprising:

laminated glass having a signal transmission region and a non-signal transmission region;

a wave transparent layer carried on the laminated glass, wherein an orthographic projection of the wave transparent layer on the laminated glass covers the signal transmission region and the non-signal transmission region, and for a detection signal with an angle of incidence of 55°-70°, a transmittance of the signal transmission region when the wave transparent layer is present is at least 3% higher than a transmittance of the signal transmission region when the wave transparent layer is absent; and a thermal insulation layer carried on the laminated glass, wherein an orthographic projection of the thermal insulation layer on the laminated glass covers the non-signal transmission region and avoids the signal transmission region.

2. The laminated glass assembly of claim 1, wherein the laminated glass comprises:

a first transparent substrate having a first surface and a second surface opposite to the first surface;

a second transparent substrate having a third surface and a fourth surface opposite to the third surface, the third surface being closer to the second surface than the fourth surface; and an adhesive film for adhering the first transparent substrate and the second transparent substrate.

3. The laminated glass assembly of claim 2, wherein the second transparent substrate defines a through hole, and at least a part of the through hole is located in the signal transmission region; and the through hole is defined in an inner region or at an edge of the laminated glass assembly, and an area S of an orthographic projection of the signal transmission region on the second surface satisfies: S≥50 mm*80 mm.

4. The laminated glass assembly of claim 3, wherein the second transparent substrate is tinted glass.

5. The laminated glass assembly of claim 2, wherein the thermal insulation layer defines a through hole, and at least a part of the through hole is located in the signal transmission region; and the through hole is defined in an inner region or at an edge of the laminated glass assembly, and an area S of an orthographic projection of the signal transmission region on the second surface satisfies: S≥50 mm*80 mm.

6. The laminated glass assembly of claim 2, wherein the adhesive film defines a through hole, and at least a part of the through hole is located in the signal transmission region; and the through hole is defined in an inner region or at an edge of the laminated glass assembly, and an area S of an orthographic projection of the signal transmission region on the second surface satisfies: S≥50 mm*80 mm.

7. The laminated glass assembly of claim 6, wherein the through hole of the adhesive film is filled with a filler, the filler has a blocking rate of no more than 2% for a vertically incident detection signal with a wavelength range of 380 nm-1650 nm or 3 mm-30 mm, and the filler has a blocking rate of no more than 5% for a detection signal with a wavelength range of 380 nm-1650 nm or 3 mm-30 mm and an angle of incidence of 55°-70°.

8. The laminated glass assembly of claim 6, wherein the adhesive film is an adhesive film with a heat insulation performance.

9. The laminated glass assembly of claim 2, wherein the wave transparent layer is disposed on the second surface, or the wave transparent layer is disposed on the third surface, or the wave transparent layer is disposed on the fourth surface.

10. The laminated glass assembly of claim 2, wherein the thermal insulation layer is disposed on the second surface, or the thermal insulation layer is disposed on the third surface, or the thermal insulation layer is disposed on one of two opposite surfaces of the wave transparent layer closer to the first transparent substrate, or the thermal insulation layer is disposed in the adhesive film.

11. The laminated glass assembly of claim 1, wherein an area of the orthographic projection of the wave transparent layer on the laminated glass accounts for more than 70% of an area of the laminated glass, an area of the orthographic projection of the thermal insulation layer on the laminated glass accounts for more than 70% of the area of the laminated glass, an area of an overlap region between the orthographic projection of the wave transparent layer on the laminated glass and the orthographic projection of the thermal insulation layer on the laminated glass accounts for at least 80% of the area of the orthographic projection of the thermal insulation layer on the laminated glass.

12. The laminated glass assembly of claim 11, wherein the overlap region between the orthographic projection of the wave transparent layer on the laminated glass and the orthographic projection of the thermal insulation layer on the laminated glass has a total solar energy transmittance equal to or less than 53%, and the signal transmission region has a transmittance of at least 85% for a detection signal with a wavelength range of 380 nm-1650 nm or 3 mm-30 mm and an angle of incidence of 55°-70°.

13. The laminated glass assembly of claim 1, wherein the wave transparent layer has at least one laminated structure comprising a high refractive-index layer and a low refractive-index layer, the high refractive-index layer has a refractive index of 1.9-2.6, the low refractive-index layer has a refractive index of 1.3-1.8, and the thermal insulation layer comprises at least one of metallic silver layer, a silver alloy layer, or a transparent conductive oxide (TCO) layer.

14. A signal transmission system, comprising a detector and a laminated glass assembly, wherein the laminated glass assembly comprises:

- laminated glass having a signal transmission region and a non-signal transmission region, wherein the laminated glass comprises:
  - a first transparent substrate having a first surface and a second surface opposite to the first surface;
  - a second transparent substrate having a third surface and a fourth surface opposite to the third surface, the third surface being closer to the second surface than the fourth surface; and
  - an adhesive film for adhering the first transparent substrate and the second transparent substrate;
- a wave transparent layer carried on the laminated glass, wherein an orthographic projection of the wave transparent layer on the laminated glass covers the signal transmission region and the non-signal transmission region, for a detection signal with an angle of incidence of 55°-70°, a transmittance of the signal transmission region when the wave transparent layer is present is at least 3% higher than a transmittance of the signal transmission region when the wave transparent layer is absent; and
- a thermal insulation layer carried on the laminated glass, wherein an orthographic projection of the thermal insulation layer on the laminated glass covers the non-signal transmission region and avoids the signal transmission region; wherein
- the detector is disposed corresponding to the signal transmission region, a detection signal emitted and/or received by the detector passes through the signal transmission region, a wavelength of the detection signal ranges from 380 nm to 1650 nm or from 3 mm to 30 mm, and the detection signal is incident into the signal transmission region at an angle of incidence of 55°-70°.

15. The signal transmission system of claim 14, wherein when the second transparent substrate, the adhesive film, and the thermal insulation layer all define through holes in communication with one another, the detector is disposed in at least one of the through holes, and a distance d between the detector and the second surface satisfies: 0 mm≤d≤1 mm; or the detector is disposed at one side of the second transparent substrate away from the first transparent substrate, and a distance d between the detector and the fourth surface satisfies: 0 mm≤d≤25 mm; and

- when only the adhesive film and the thermal insulation layer both define through holes in communication with each other, the detector is disposed at one side of the second transparent substrate away from the first transparent substrate, and the distance d between the detector and the fourth surface satisfies: 0 mm≤d≤25 mm.

16. The signal transmission system of claim 14, wherein the detection signal is circularly polarized light, or P-polarized light, or mixed light of P-polarized light and S-polarized light and a proportion of the P-polarized light in the mixed light is greater than or equal to 50%.

17. The signal transmission system of claim 14, wherein the detector is a visible-light camera, a near-infrared camera, a LiDAR, or a millimeter-wave radar.

18. A vehicle, comprising a vehicle body and a signal transmission system, wherein the signal transmission system comprises a detector and a laminated glass assembly, and the laminated glass assembly comprises:

- laminated glass having a signal transmission region and a non-signal transmission region, wherein the laminated glass comprises:
  - a first transparent substrate having a first surface and a second surface opposite to the first surface;
  - a second transparent substrate having a third surface and a fourth surface opposite to the third surface, the third surface being closer to the second surface than the fourth surface; and
  - an adhesive film for adhering the first transparent substrate and the second transparent substrate;
- a wave transparent layer carried on the laminated glass, wherein an orthographic projection of the wave transparent layer on the laminated glass covers the signal transmission region and the non-signal transmission region, and for a detection signal with an angle of incidence of 55°-70°, a transmittance of the signal transmission region when the wave transparent layer is present is at least 3% higher than a transmittance of the signal transmission region when the wave transparent layer is absent; and
- a thermal insulation layer carried on the laminated glass, wherein an orthographic projection of the thermal insulation layer on the laminated glass covers the non-signal transmission region and avoids the signal transmission region; wherein
- the detector is disposed corresponding to the signal transmission region, a detection signal emitted and/or received by the detector passes through the signal transmission region, a wavelength of the detection signal ranges from 380 nm to 1650 nm or from 3 mm to 30 mm, and the detection signal is incident into the signal transmission region at an angle of incidence of 55°-70°; wherein the signal transmission system is carried on the vehicle body.

* * * * *